United States Patent
Maharia

(10) Patent No.: US 9,935,887 B1
(45) Date of Patent: Apr. 3, 2018

(54) FRAGMENTATION AND REASSEMBLY OF NETWORK TRAFFIC

(71) Applicant: Juniper Networks, Inc., Sunnyvale, CA (US)

(72) Inventor: Rashmi Maharia, Sikar (IN)

(73) Assignee: Juniper Networks, Inc., Sunnyvale, CA (US)

( * ) Notice: Subject to any disclaimer, the term of this patent is extended or adjusted under 35 U.S.C. 154(b) by 176 days.

(21) Appl. No.: 14/863,805

(22) Filed: Sep. 24, 2015

(51) Int. Cl.
*H04L 12/805* (2013.01)
*H04L 12/801* (2013.01)

(52) U.S. Cl.
CPC ............ *H04L 47/365* (2013.01); *H04L 47/34* (2013.01)

(58) Field of Classification Search
None
See application file for complete search history.

(56) References Cited

U.S. PATENT DOCUMENTS

| 2008/0205314 | A1* | 8/2008 | Pecen | H04L 47/10 370/310 |
| 2010/0008381 | A1* | 1/2010 | Jang | H04L 1/1614 370/476 |
| 2010/0118986 | A1* | 5/2010 | Hong | H04L 1/1829 375/259 |
| 2013/0250810 | A1* | 9/2013 | Ho | H04L 41/12 370/255 |
| 2015/0117452 | A1* | 4/2015 | Mosko | H04L 47/365 370/392 |
| 2016/0337838 | A1* | 11/2016 | Lee | H04W 48/14 |

* cited by examiner

*Primary Examiner* — Jamal Javaid
*Assistant Examiner* — Saad Khawar
(74) *Attorney, Agent, or Firm* — Harrity & Harrity, LLP

(57) ABSTRACT

A device may include one or more processors. The one or more processors may receive a request for one or more parameters associated with the device. The one or more processors may determine, as a response, the one or more parameters associated with the device. The one or more processors may generate a set of logical units associated with encapsulating the one or more parameters. The set of logical units may be associated with a particular communications protocol. The one or more processors may fragment the set of logical units into a set of segments based on a maximum transmission unit (MTU) size for a network path. The set of logical units may be fragmented without fragmenting any logical units of the set of logical units. The one or more processors may transmit the set of segments to a destination network device.

20 Claims, 10 Drawing Sheets

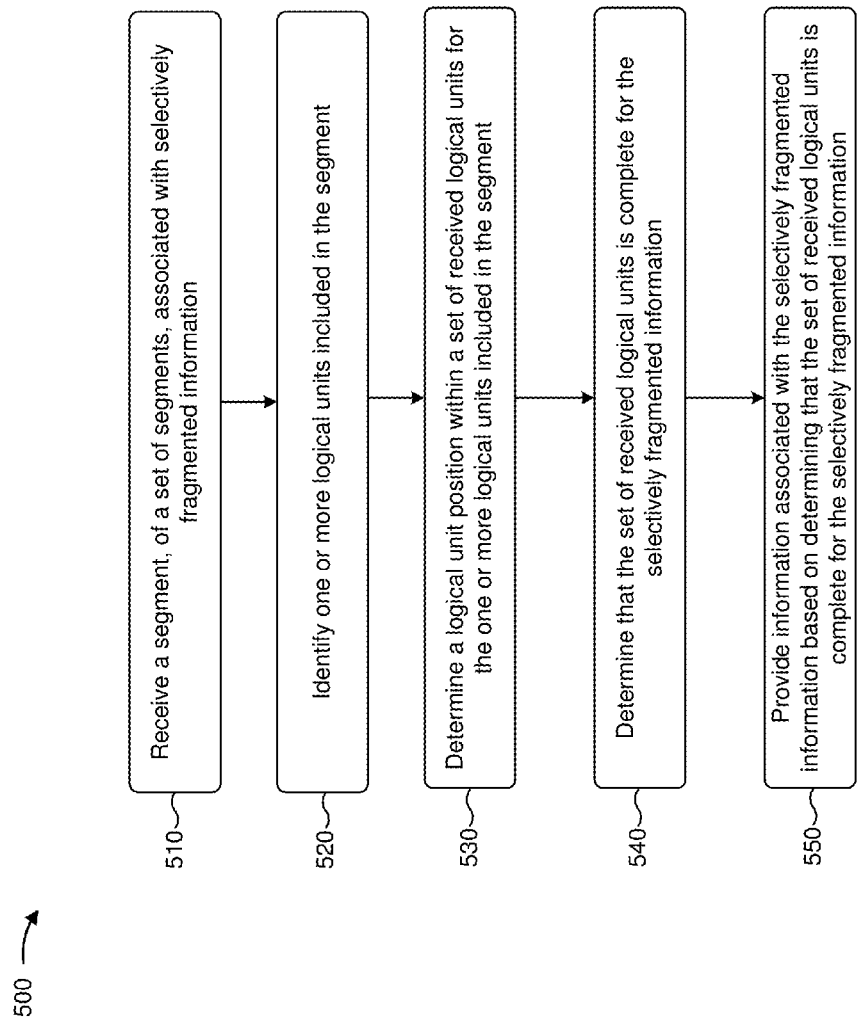

FRAGMENTATION AND REASSEMBLY OF NETWORK TRAFFIC

BACKGROUND

A target network device and a destination network device may utilize a particular communications protocol. For example, the target network device may encode information using a selected communications protocol, such as a type-length-value (TLV) based communications protocol, an extensible markup language (XML) based communications protocol, a JavaScript object notation (JSON) based communications protocol, or the like. The destination network device may receive the information and may decode the information based on the selected communications protocol.

SUMMARY

According to some possible implementations, a device may include one or more processors. The one or more processors may receive a request for one or more parameters associated with the device. The one or more processors may determine, as a response, the one or more parameters associated with the device. The one or more processors may generate a set of logical units associated with encapsulating the one or more parameters. The set of logical units may be associated with a particular communications protocol. The one or more processors may fragment the set of logical units into a set of segments based on a maximum transmission unit (MTU) size for a network path. The set of logical units may be fragmented without fragmenting any logical units of the set of logical units. The one or more processors may transmit the set of segments to a destination network device.

According to some possible implementations, a computer-readable medium may store instructions, the instructions may include one or more instructions that, when executed by one or more processors, may cause the one or more processors to transmit a probe request to a target network device. The probe request may be associated with causing the target network device to generate a probe response. The computer-readable medium may store instructions, the instructions may include one or more instructions that, when executed by one or more processors, may cause the one or more processors to receive, via a particular network path, a segment, of a set of segments, associated with the probe response based on transmitting the probe request. The probe response may be application-level fragmented into the set of segments by the target network device based on a maximum transmission unit (MTU) size of the particular network path. The segment may include including one or more logical units of a set of logical units. The logical unit, of the set of logical units, may include information associated with the probe response. The computer-readable medium may store instructions, the instructions may include one or more instructions that, when executed by one or more processors, may cause the one or more processors to determine a logical unit position, within the set of logical units, for each logical unit, of the one or more logical units, after receiving the segment. The computer-readable medium may store instructions, the instructions may include one or more instructions that, when executed by one or more processors, may cause the one or more processors to determine that a set of received logical units is complete for the probe response after receiving the segment. The computer-readable medium may store instructions, the instructions may include one or more instructions that, when executed by one or more processors, may cause the one or more processors to provide information associated with the probe response based on determining that the set of received logical units is complete for the probe response and based on determining the logical unit position, within the set of logical units, for each logical unit of the one or more logical units.

According to some possible implementations, a method may include causing, by a device, an identification of a set of logical unit boundaries of a set of logical units of information. The method may include causing, by the device, the set of logical units to be fragmented into a set of segments based on the set of logical unit boundaries. The method may include causing, by the device, the set of segments to be transmitted via a set of messages. The set of messages may include ordering information identifying an order of logical units for the set of logical units. Each message, of the set of messages, may not exceed a data unit size which, when exceeded by a particular message, results in the particular message being fragmented during transmission. The method may include causing, by the device, the set of messages to be received. The method may include causing, by the device, the set of logical units to be reassembled after the set of messages are caused to be received based on the ordering information identifying the order of logical units for the set of logical units. The method may include causing, by the device, the information to be provided based on causing the set of logical units to be reassembled.

BRIEF DESCRIPTION OF THE DRAWINGS

FIG. 5 is a flow chart of an example process for performing data reassembly for a selectively fragmented probe response.

DETAILED DESCRIPTION

Figure 1:
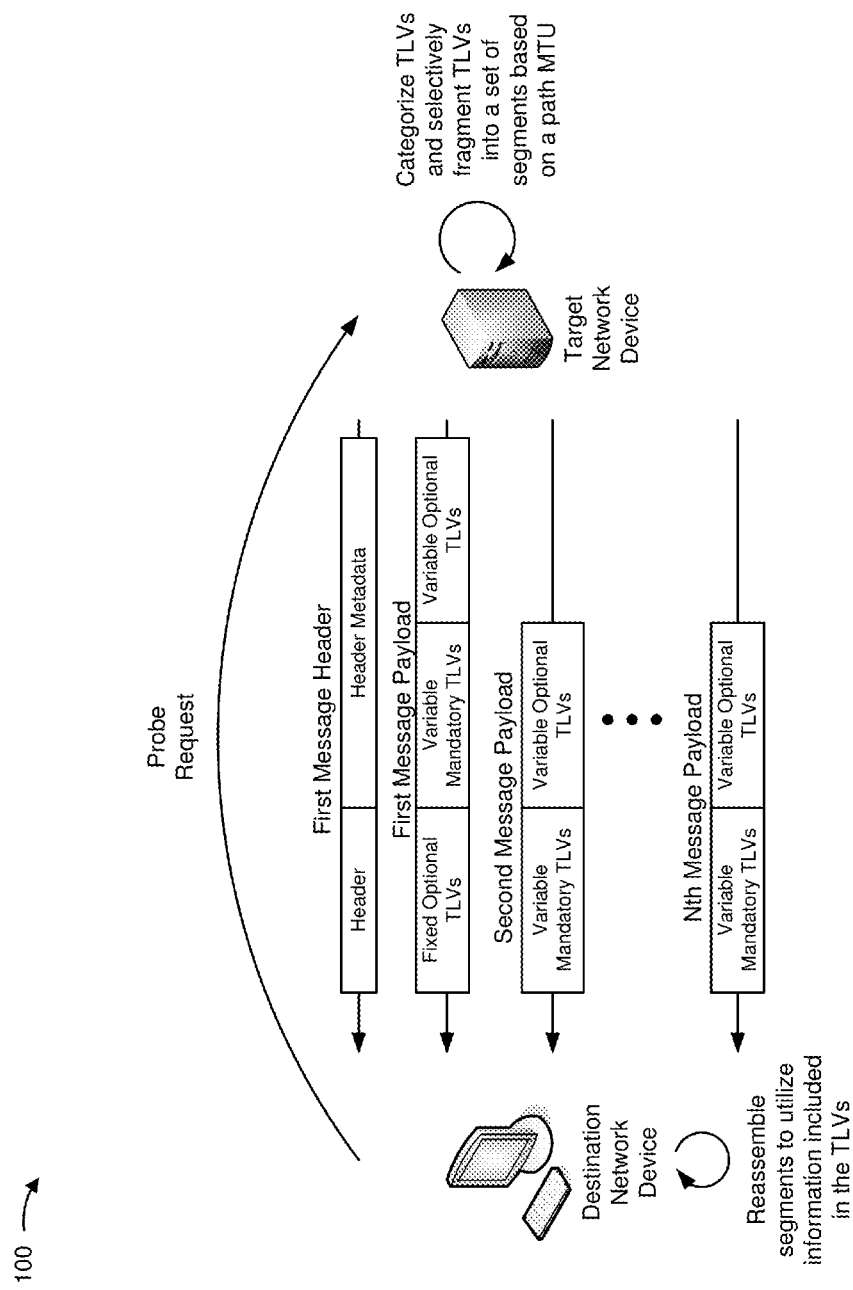
FIG. 1 is a diagram of an overview of an example implementation described herein.

The following detailed description of example implementations refers to the accompanying drawings. The same reference numbers in different drawings may identify the same or similar elements.

A first network device and a second network device may exchange information via a network. For example, a target network device may transmit a probe response to a destination network device based on receiving a probe request from the destination network device. A probe request may refer to a request for information identifying one or more parameters associated with the target network device for utilization in performing analytics on the target network device, establishing a connection with the target network device, or the like. The first network device and the second network device may utilize a particular communications protocol for the exchange of information. For example, the target network device may encode the probe response using one or more communications protocols for transmission. The destination network device may decode the probe response after receiving the probe response, and may utilize the information, such as for performing analytics on the target network device, establishing a connection to a network associated with the target network device, or the like.

Some communications protocols may facilitate fragmentation of information into logical units that may be transmitted as one or more segments of one or more messages. For example, a type-length-value (TLV) based communications protocol may utilize multiple TLVs as logical units to transmit a message, and the multiple TLVs may be transmitted using multiple segments. The target network device may transmit a set of TLVs sequentially (e.g., a first message including a first TLV, a second message including a second TLV, or the like). The target network device may transmit multiple TLVs in a single message (e.g., a first message including 2 TLVs, a second message including 5 TLVs, a third message including 1 TLV, etc.). TLVs may be categorized into a set of types, such as a fixed mandatory TLV, a fixed optional TLV, a variable mandatory static TLV, a variable mandatory TLV, a variable optional TLV, or the like.

A fixed mandatory TLV may refer to a TLV that is fixed for a network device for a duration of a network traffic flow, and may be included in each probe response. For example, a fixed mandatory TLV may include a device identifier, such as a device serial identifier or the like.

A fixed optional TLV may refer to a TLV that is fixed for the duration of a network traffic flow but is not included in each probe response. For example, a fixed optional TLV may be included in an initial probe response and may identify a network device type, a set of network device capabilities, or the like.

A variable mandatory static TLV may refer to a TLV that is not fixed for the duration of a network traffic flow and is included in each segment of a probe response (e.g., when the probe response is fragmented into multiple segments). For example, a variable mandatory static TLV may include information identifying a timestamp associated with a probe response.

A variable mandatory TLV may refer to a TLV that is not fixed for the duration of a network traffic flow and is included in each probe response (e.g., but not in each probe segment). For example, a first variable mandatory TLV in a first probe response may be different from a corresponding second variable mandatory TLV in a second probe response, and may identify a resource utilization (e.g., a central processing unit utilization, a memory utilization, etc.), a set of network traffic metrics (e.g., a set of flow metrics, a transmission/reception packet metric, a transmission/reception byte metric, a unicast metric, a broadcast metric, a multicast metric, etc.), or the like.

A variable optional TLV may refer to a TLV that is not fixed for the duration of a network traffic flow and is not required to be included in each probe response. For example, a variable optional TLV may include information identifying a network device name, a quantity of logical interfaces associated with a network device, or the like and may be included in a probe response when the identified information is altered.

In some implementations, the destination network device and the target network device may utilize the same classifications of TLVs. For example, the destination network device and the target network device may each classify the same TLV as the same type of TLV. In some implementations, the destination network device and/or the target network device may trigger a change of classification. For example, the destination network device may transmit information indicating that two types of TLVs are to be classified together as a single type of TLV, and may receive an acknowledgement from target network device confirming the change to the classification.

When the destination network device transmits a probe request to the target network device to obtain one or more parameters associated with the target network device, the target network device may transmit a probe response that includes a quantity of information that exceeds a threshold, resulting in unintended fragmentation during transmission and/or a degradation of network performance. Implementations, described herein, may selectively fragment information, such as a probe response, to reduce a likelihood of unintended fragmentation and/or reduce network traffic. When a transmission is fragmented into multiple segments, the destination network device may be unable to reassemble the multiple segments and/or may utilize excessive computing resources to perform reassembly. Implementations, described herein, may facilitate reassembly of a fragmented transmission, such as a selectively fragmented probe response or the like.

FIG. 1 is a diagram of an overview of an example implementation 100 described herein. As shown in FIG. 1, example implementation 100 may include a destination network device and a target network device. The destination network device and the target network device may be connected via one or more intermediate network devices (e.g., nodes) of a network.

As further shown in FIG. 1, the destination network device may transmit a probe request to the target network device. For example, the destination network device may request that the target network device provide information identifying a set of parameters of the target network device. The target network device may receive the probe request and may determine the set of parameters. The target network device may encode the set of parameters as a set of logical units. For example, the target network device may encode the set of parameters via a set of TLVs and may categorize the set of TLVs into a set of categories (e.g., a fixed mandatory TLV, a fixed optional TLV, a variable mandatory static TLV, a variable mandatory TLV, a variable optional TLV, or the like). The target network device may identify a maximum transmission unit (MTU) for a network path associated with transmitting information to the destination network device. The MTU may refer to a maximum information size (e.g., a maximum quantity of bits) for a single packet transmitted via the network path. The target network device may selectively fragment the set of TLVs into a set of segments based on categorizing the set of TLVs and based on the MTU. The target network device may generate one or more messages for transmitting the set of segments. For example, the target network device may generate a first message for a first segment, a second message for a second segment, an nth message for an nth segment, or the like.

With regards to a TLV based communications protocol, the first message may include a message header and header metadata. The message header may include a mode identifier, which indicates that the set of TLVs are being interleaved rather than provided sequentially, that the set of TLVs are selectively fragmented, or the like. The message header may include one or more TLVs, such as a fixed mandatory TLV (e.g., that identifies the target network device), a variable mandatory static TLV (e.g., that identifies the first segment), or the like. The message header metadata may include information identifying a quantity of other TLVs that are included in the first message and/or other messages. For example, the message header metadata may identify a quantity of variable mandatory TLVs, a quantity of variable optional TLVs, or the like.

The first message may include a message payload of one or more logical units. For example, the message payload may include a group of interleaved TLVs, of the set of TLVs, such as a fixed optional TLV (e.g., a device type of the target network device, a set of capabilities of the target network device, or the like), a variable mandatory TLV (e.g., a memory utilization of the target network device or the like), a variable optional TLV (e.g., a device name of the target network device or the like), or the like. Similarly, the second message, the nth message, etc. may include a message payload, which respectively include groups of interleaved TLVs, of the set of TLVs, such as one or more variable mandatory TLVs, one or more variable optional TLVs, or the like. When the target network device interleaves TLVs (e.g., TLVs are transmitted out of order), the target network device may not require an acknowledgement of a particular TLV before sending the next TLV in an order, thereby reducing a likelihood of reduced network performance when the particular TLV is dropped or the acknowledgement associated therewith is dropped.

As further shown in FIG. 1, the destination network device may receive the set of messages, and may reassemble logical units included in the set of segments to utilize information included in the set of logical units. For example, the destination network device may store received TLVs, remove duplicate TLVs from the stored TLVs, rearrange stored TLVs (e.g., based on TLV identifiers), or the like. The destination network device may request that the target network device resend one or more missing logical units (e.g., one or more TLVs not received by the destination network device within a threshold period of time). The destination network device may transmit an acknowledgement of received logical units. The destination network device may determine that all logical units, a threshold quantity of logical units, or the like have been received and reordered, and may utilize information included in the logical units. For example, the destination network device may utilize the set of parameters identified by the set of TLVs to determine whether to connect to a network associated with the target network device.

Although implementations, described herein, may be described in terms of a TLV based communications protocol, implementations, described herein, may utilize another type of communications protocol, such as an extensible markup language (XML) based communications protocol, a JavaScript object notation (JSON) based communications protocol, or the like.

Although implementations, described herein, may be described in terms of a probe request and a probe response, implementations, described herein, may utilize another communications scenario, such as another type of request and associated response scenario, a message transmission scenario (without a request for the message), or the like.

In this way, one or more network devices (e.g., a destination network device, a target network device, one or more intermediate network devices, or the like) may facilitate selective fragmentation of a message and/or reassembly of the message for a network traffic protocol that permits fragmentation of information into logical units.

Figure 2:
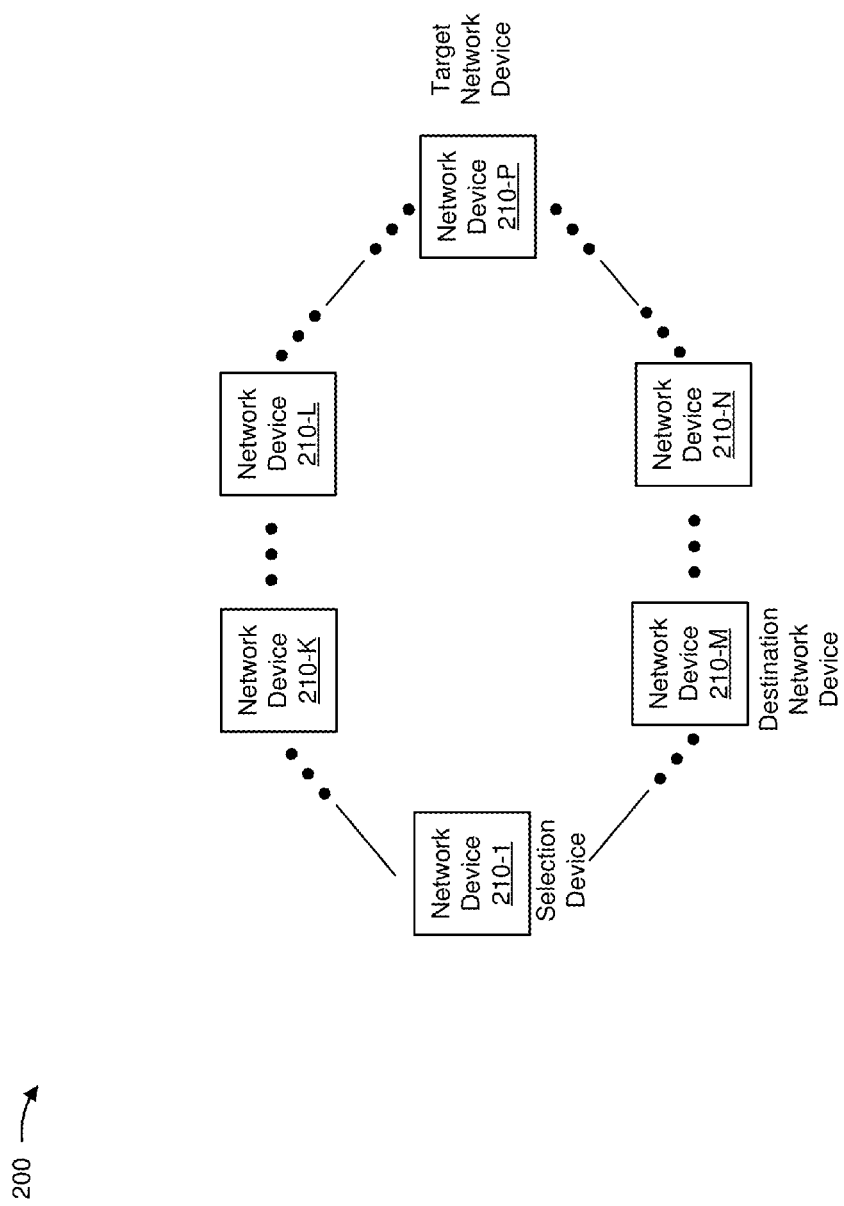
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210") and one or more networks. Devices of environment 200 may interconnect via wired connections, wireless connections, or a combination of wired and wireless connections.

Network device 210 may include one or more devices capable of generating, storing, receiving, processing, and/or providing information associated with a device. For example, network device 210 may include a firewall, a router, a gateway, a switch, a hub, a bridge, a reverse proxy, a server (e.g., a proxy server), or a similar device. Additionally, or alternatively, network device 219 may include a device that generates a probe request and/or receives a probe response, such as a computer (e.g., a desktop computer, a laptop computer, a tablet computer, etc.), a mobile device, a wearable device, or the like. In some implementations, network device 210 may utilize one or more communications protocols for transmitting and/or receiving information. For example, network device 210 may utilize a TLV based communications protocol, an XML based communications protocol, a JSON based protocol, or another communications protocol that permits fragmentation of information into logical units.

When a first network device 210 receives a probe request from a second network device 210, the first network device 210 may be termed a target network device 210. The second network device 210, which transmits the probe request to target network device 210 and receives a probe response from target network device 210 via a set of third network devices 210, may be termed a destination network device 210. The set of third network devices 210, which may be intermediate network nodes of a network traffic path connecting target network device 210 and destination network device 210, may be termed a set of intermediate network devices 210.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
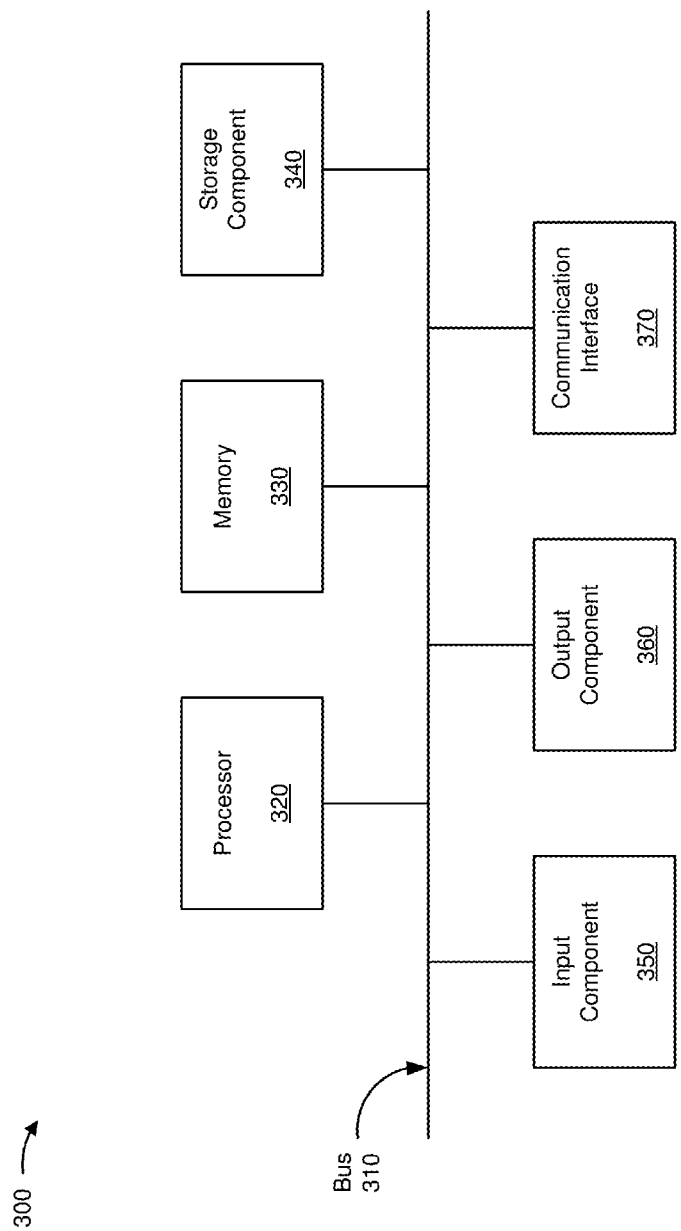
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
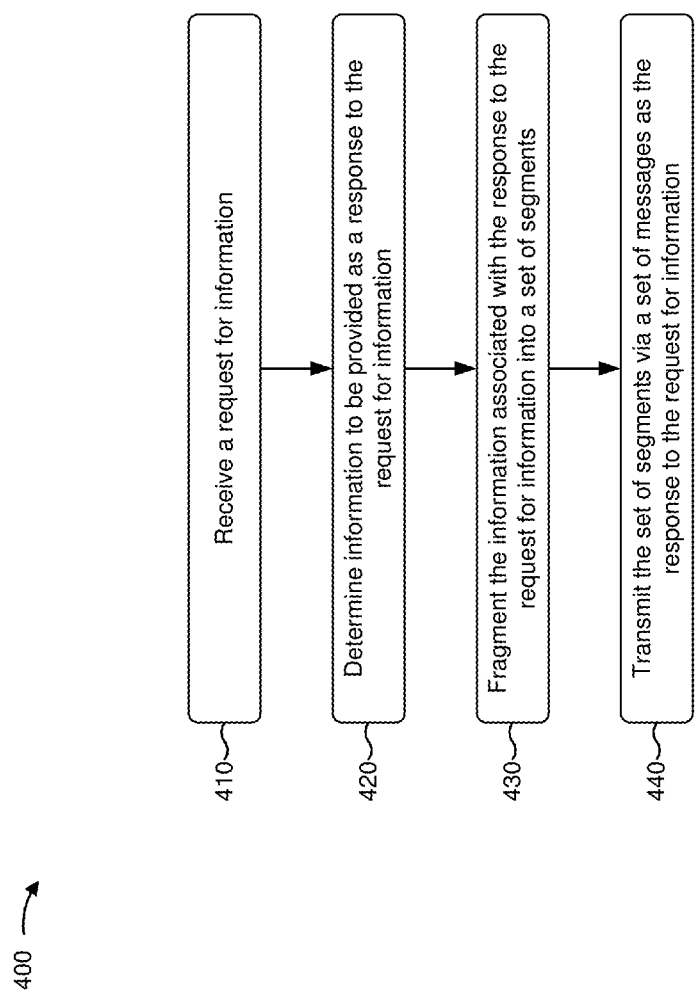
FIG. 4 is a flow chart of an example process for providing a selectively fragmented probe response.

FIG. 4 is a flow chart of an example process 400 for providing a selectively fragmented probe response. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include receiving a request for information (block 410). For example, network device 210 (e.g., target network device 210) may receive a probe request from another network device 210 (e.g., destination network device 210) via a set of network devices 210 (e.g., intermediate network devices 210). In some implementations, target network device 210 may receive a particular probe request that identifies information to be provided. For example, target network device 210 may determine that the particular probe request indicates that target network device 210 is to provide information identifying a set of parameters related to target network device 210. In some implementations, target network device 210 may receive a request to transmit information. For example, target network device 210 may receive information, and may be triggered to fragment the information and transmit the information.

As further shown in FIG. 4, process 400 may include determining information to be provided as a response to the request for information (block 420). For example, network device 210 (e.g., target network device 210) may determine the information associated with a probe response based on receiving the probe request. In some implementations, target network device 210 may determine a set of parameters as the probe response. For example, target network device 210 may determine a device identifier of target network device 210, a device type of target network device 210, a timestamp (e.g., associated with the probe response), one or more network traffic metrics associated with target network device 210 and/or a network, information identifying an equal-cost multipath (ECMP) set associated with interfaces of target network device 210, or the like. In some implementations, target network device 210 may receive the information to be provided. For example, when target network device 210 receives information as a request to transmit the information, target network device 210 may utilize the received information, may fragment the received information, and may transmit the received information.

In some implementations, target network device 210 may determine header information associated with the probe response. For example, target network device 210 may generate header data that indicates that the probe response is selectively fragmented (e.g., a TLV flag indicating that a set of TLVs are selectively fragmented). In this case, target network device 210 may determine to utilize selective fragmentation based on determining that destination network device 210 is configured to receive and reassemble a selectively fragmented probe response. Additionally, or alternatively, target network device 210 may generate header data that includes one or more parameters. For example, for a TLV communications protocol, target network device 210 may determine that one or more parameters are to be associated with a fixed mandatory TLV or a variable mandatory static TLV (e.g., that are intended to be included in each message transmitted to destination network device 210) based on a type of parameter (e.g., whether the parameter is a fixed parameter, a variable parameter, etc.) or the like. In this case, target network device 210 may generate header data that includes the fixed mandatory TLV or the variable mandatory static TLV. In some implementations, target network device 210 may determine information identifying other TLVs. For example, target network device 210 may determine a quantity of variable mandatory TLVs, variable optional TLVs, or the like based on a quantity of other parameters that are associated with transmission via variable mandatory TLVs, variable optional TLVs, or the like. In this case, target network device 210 may generate header metadata identifying the quantity of variable mandatory TLVs, variable optional TLVs, or the like.

In some implementations, target network device 210 may generate one or more payload TLVs associated with the probe response. For example, target network device 210 may determine that another one or more parameters are to be associated with another type of TLV that is not intended for inclusion in each message transmitted to destination network device 210, such as a fixed optional TLV, a variable mandatory TLV, a variable optional TLV, or the like, and may generate one or more TLVs based on the other one or more parameters. In some implementations, target network device 210 may combine multiple categories of TLV when generating the one or more payload TLVs. For example, target network device 210 may combine variable mandatory type TLVs and variable optional type TLVs into a single combined type of TLV.

In some implementations, target network device 210 may generate another type of logical unit for encapsulating information. For example, for an XML communications protocol, target network device 210 may generate a set of name-value pairs with start-tags and end-tags to demarcate logical units that are to be included in a set of segments based on fragmenting information including the set of name-value pairs. Similarly, for a JSON communications protocol, target network device 210 may generate a set of JSON objects as logical units that are to be included in a set of segments based on fragmenting information including the set of JSON objects.

In some implementations, target network device 210 may determine compatibility information. For example, target network device 210 may determine that destination network device 210 is capable of receiving and/or reassembling selectively fragmented information, such as a probe response (e.g., based on information included in the probe request, based on exchanging one or more communications with target network device 210, or the like). In this way, target network device 210 maintains compatibility with destination network devices 210 that are not configured to utilize a selectively fragmented probe response.

In some implementations, target network device 210 may determine segment size information. For example, target network device 210 may determine a maximum transmission unit size (MTU) (e.g., a data unit size which, when exceeded by a message, may result in the message being fragmented during transmission) for a network path associated with transmitting the probe response to destination network device 210. A data unit may refer to a quantity of information, such as a quantity of bits, a quantity of bytes, etc.

In some implementations, target network device 210 may access stored information to determine the MTU for the network path. For example, target network device 210 may receive information identifying the MTU and may store the information for utilization. Additionally, or alternatively, target network device 210 may receive information from one or more intermediate network devices 210 based on querying the one or more intermediate network devices 210. For example, target network device 210 may determine one or more network paths for communicating with destination network device 210, and may request and receive information from one or more intermediate network devices 210 associated with the one or more network paths indicating one or more MTUs for the one or more network paths. In this case, target network device 210 may selectively fragment the information based on a minimum MTU of the network path with which the segment is intended to be transmitted (e.g., target network device 210 may fragment the information to ensure that there is no segment that exceeds the smallest MTU of a set of MTUs associated a set of network paths with which the segment may be transmitted).

In some implementations, target network device 210 may determine updated segment size information. For example, when an MTU of a network path changes, target network device 210 may receive information identifying an updated MTU for the network path (e.g., from another network device 210).

In some implementations, target network device 210 may determine that the segment size satisfies a threshold. For example, target network device 210 may determine that the segment size satisfies a threshold that permits header information and header metadata to be provided via a single message. Additionally, or alternatively, for a TLV based communications protocol, target network device 210 may determine that the segment size satisfies a threshold that permits header information, header metadata, and fixed optional TLVs to be provided via a single message. Additionally, or alternatively, network device 210 may determine that the segment size satisfies a threshold that permits the largest logical unit (e.g., the largest TLV), of a set of logical units, to be transmitted without being fragmented. In this way, target network device 210 ensures that, when the information is selectively fragmented, fragments can be sufficiently large to permit particular information to be transmitted without being fragmented (e.g., target network device 210 fragments the information without fragmenting a logical unit of the information). Alternatively, target network device 210 may determine that information cannot be selectively fragmented without fragmenting logical units or the like. In this case, target network device 210 may indicate to destination network device 210 that selective fragmentation cannot occur, and may cause destination network device 210 to utilize a reassembly procedure that accounts for unintentional fragmentation.

As further shown in FIG. 4, process 400 may include fragmenting information, associated with the response to the request for information, into a set of segments (block 430). For example, network device 210 (e.g., target network device 210) may fragment the information associated with the probe response into the set of segments. In some implementations, target network device 210 may generate a particular segment of the information for a particular message that is to be transmitted to destination network device 210. For example, target network device 210 may generate header information, header metadata information, and one or more fixed optional TLVs for the particular message. Additionally, or alternatively, target network device 210 may fragment the information into one or more other segments to be transmitted via one or more other messages. For example, target network device 210 may fragment the information to include one or more variable mandatory TLVs, variable optional TLVs, or the like in one or more other segments to be transmitted via one or more other messages.

In some implementations, target network device 210 may fragment the information without fragmenting a logical unit. For example, target network device 210 may identify boundaries of the logical unit and may fragment the information at the boundaries of the logical unit. In this case, target network device 210 may fragment the information at TLV boundaries to cause each TLV, of a set of TLVs, to be included in a single segment. Similarly, target network device 210 may fragment the information to cause each name-value pair, of a set of name-value pairs, to be included in a single segment. Similarly, target network device 210 may fragment the information to cause each JSON object, of a set of JSON objects, to be included in a single segment. In some implementations, target network device 210 may fragment the information to include multiple logical units in a single segment. For example, target network device 210 may include multiple TLVs, multiple name-value pairs, multiple JSON objects, or the like in a single segment. In this way, target network device 210 reduces reassembly complexity by ensuring that each logical unit is transmitted without being fragmented.

In some implementations, target network device 210 may fragment the information (e.g., a set of logical units) based on an MTU of a network path. For example, target network device 210 may fragment a set of TLVs such that a message including header data and payload data (e.g., a segment) does not exceed the MTU of a network path with which the message is to be transmitted, thereby reducing a likelihood that the message (and thus, a logical unit) is fragmented during transmission and reducing a complexity of reassembly of the information by destination network device 210.

In some implementation, target network device 210 may cause information to be fragmented. For example, target network device 210 may transmit information, such that the information undergoes application-level fragmentation, and may include information associated with facilitating reassembly based on the intended application-level fragmentation. In this way, target network device 210 may facilitate reassembly of information that undergoes application level fragmentation.

In some implementations, target network device 210 may reorder one or more logical units to reduce a quantity of segments when fragmenting the information. For example, when a first logical unit utilizes 40% of an MTU, a second logical unit utilizes 70% of an MTU, a third logical unit utilizes 60% of an MTU, and a fourth logical unit utilizes 30% of an MTU, target network device 210 may fragment the information to include the first logical unit and the third logical unit in a first segment and the second logical unit and the fourth logical unit in a second segment. In this way, target network device 210 reduces a quantity of segments and a quantity of corresponding messages, thereby reducing network traffic, relative to fragmenting the information sequentially to include the first logical unit in a first segment, the second logical unit in a second segment, and the third logical unit and the fourth logical unit in a third segment.

In some implementations, target network device 210 may include information associated with reassembly of the information. For example, target network device 210 may include identifiers of an order of the logical units to facilitate reordering. Additionally, or alternatively, target network device 210 may generate a segment identifier (e.g., identifying a segment of the set segments), a response identifier (e.g., identifying the probe response with which a segment is associated), a logical unit identifier (e.g., identifying a logical unit of the set of logical units), information identifying a quantity of segments associated with a probe response, information identifying a quantity of logical units included in a segment, or the like. In this way, target network device 210 facilitates reassembly of selectively fragmented information.

As further shown in FIG. 4, process 400 may include transmitting the set of segments via a set of messages as the response to the request for information (block 440). For example, network device 210 (e.g., target network device 210) may transmit the set of segments via a set of messages to another network device 210 (e.g., destination network device 210) as the probe response. In this case, destination network device 210 may be caused to reassemble the set of segments and/or utilize the information included in the set of segments, as described herein with regard to FIG. 5. In some implementations, target network device 210 may generate the set of messages. For example, target network device 210 may generate a message that includes a first portion of the information that is intended for inclusion in each message (e.g., a mandatory TLV, such as a TLV associated with indicating an order for assembling other TLVs) and a second portion of the information that is not intended for inclusion in each message (e.g., a segment including an optional TLV).

In some implementations, target network device 210 may transmit the set of messages via multiple network paths. For example, target network device 210 may transmit a first message, of the set of messages, to destination network device 210 via a first network path (e.g., via a first set of intermediate network devices 210) and a second message, of the set of messages, to destination network device 210 via a second network path (e.g., via a second set of intermediate network devices 210). In some implementations, target network device 210 may select a network path of a set of network paths. For example, target network device 210 may select a first network path of a set of network paths. In this case, based on detecting a transmission error via the first network path, target network device 210 may select a second network path, of the set of network paths, for other messages, and may alter an assignment of logical units to the other messages based on an MTU of the second network path.

In some implementations, target network device 210 may retransmit one or more messages of the set of messages. For example, when a threshold quantity of time elapses (e.g., from destination network device 210 transmitting the probe request), destination network device 210 may transmit a probe retry request identifying one or more messages not received by destination network device 210. In this case, target network device 210 may retransmit the one or more messages not received by destination network device 210.

In some implementations, target network device 210 may receive acknowledgement information based on transmitting the set of messages. For example, target network device 210 may receive a set of acknowledgement messages from destination network device 210 indicating that destination network device 210 received the set of messages. In some implementations, target network device 210 may retransmit one or more messages of the set of messages based on receiving the set of acknowledgement messages. For example, when a threshold quantity of time elapses, target network device 210 may retransmit one or more messages for which an acknowledgement message has not been received by target network device 210. In some implementations, target network device 210 may receive a bulk acknowledgement message. For example, destination network device 210 may consolidate multiple acknowledgment messages into a single message acknowledging multiple received messages of the set of messages, and target network device 210 may receive the single message from destination network device 210. In this way, destination network device 210 reduces network congestion by reducing a quantity of acknowledgement messages transmitted to target network device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for performing data reassembly for a selectively fragmented probe response. In some implementations, one or more process blocks of FIG. 5 may be performed by network device 210. In some implementations, one or more process blocks of FIG. 5 may be performed by another device or a group of devices separate from or including network device 210.

As shown in FIG. 5, process 500 may include receiving a segment, of a set of segments, associated with selectively fragmented information (block 510). For example, network device 210 (e.g., destination network device 210) may receive the segment associated with a probe response from another network device 210 (e.g., target network device 210). In this case, target network device 210 may have selectively fragmented the information to cause each message (e.g., header data and payload data) to not exceed an MTU of a network path via which the message is transmitted, thereby reducing a likelihood that the message is unintentionally fragmented during transmission and resulting in reduced reassembly complexity. Alternatively, the information may have undergone application-level fragmenting based on an MTU of a network path with which the message is transmitted. In some implementations, destination network device 210 may receive the segment via a set of intermediate network devices 210. For example, target network device 210 may transmit a message, which includes the segment, via a particular network traffic path that includes one or more intermediate network devices 210. In some implementations, network device 210 may receive multiple segments via multiple network paths. For example, destination network device 210 may receive a first message, which includes a first segment, via a first network path and a second message, which includes a second segment, via a second network path.

In some implementations, destination network device 210 may receive the segment after application-level fragmentation. For example, destination network device 210 may receive a segment that was fragmented at an application-level and that includes information associated with performing reassembly after application-level fragmentation.

In some implementations, destination network device 210 may receive the segment based on transmitting a request (e.g., a probe request). For example, destination network device 210 may transmit a probe request to target network device 210, thereby causing target network device 210 to generate a probe response, selectively fragment information associated with the probe response into a set of segments, and transmit the set of segments to destination network device 210 via a set of messages. Additionally, or alternatively, destination network device 210 may receive the segment based on transmitting a retry request. For example, destination network device 210 may determine that a threshold period of time has elapsed (e.g., from transmitting the probe request) and that one or more segments have not been received, and may transmit a retry request to obtain the one or more segments that have not been received. In this case, target network device 210 may be caused to transmit the one or more segments based on receiving the retry request.

As further shown in FIG. 5, process 500 may include identifying one or more logical units included in the segment (block 520). For example, network device 210 (e.g., destination network device 210) may identify the one or more logical units included in the segment of the probe response. In some implementations, destination network device 210 may determine information associated with identifying a logical unit. For example, destination network device 210 may receive a segment that includes a logical unit identifier (e.g., identifying the logical unit), a probe response identifier (e.g., identifying the probe response with which the logical unit is associated), a quantity of logical units associated with the probe response, or the like. In this case, destination network device 210 may identify the logical unit, the probe response associated with the logical unit, a logical unit position of the logical unit within a set of logical units of the probe response, or the like.

In some implementations, destination network device 210 may configure and/or update one or more parameters associated with the probe response based on the information associated with identifying the logical unit. For example, destination network device 210 may update a parameter identifying a quantity of logical units for the probe response. Additionally, or alternatively, destination network device 210 may update a parameter identifying a quantity of logical units received for the probe response. For example, destination network device 210 may alter a bitmap representing logical units received for the probe response based on the information associated with identifying the logical unit.

In some implementations, destination network device 210 may store information associated with identifying the logical unit. For example, destination network device 210 may store information identifying a first logical unit when the first logical unit is received, and may subsequently store information identifying a second logical unit when the second logical unit is received. In some implementations, destination network device 210 may store information associated with identifying a message that includes the logical unit (e.g., a message fragmented into a set of logical units). For example, destination network device 210 may store information regarding a first message, and may remove the information regarding the first message when the first message is reassembled and a second message is received. In this way, destination network device 210 facilitates tracking of a most recently received message for utilization in reassembly. In some implementations, destination network device 210 may store information identifying multiple received logical units. For example, destination network device 210 may store logical unit identifiers for each received logical unit for the duration of a network traffic flow. Additionally, or alternatively, destination network device 210 may store an identifier of the probe response, an identifier of multiple probe responses, or the like, thereby facilitating determining with which probe response a received logical unit is associated.

In some implementations, destination network device 210 may analyze the logical unit to identify the logical unit. For example, for a TLV communications protocol, destination network device 210 may process the logical unit to identify header information associated with the TLV, type information associated with the TLV, or the like. Similarly, for an XML communications protocol, destination network device 210 may process the logical unit to identify name information associated with the logical unit, thereby facilitating identification of the logical unit.

In some implementations, destination network device 210 may transmit an acknowledgement message based on identifying the logical unit. For example, destination network device 210 may transmit one or more acknowledgement messages (e.g., including information identifying a logical unit, information identifying a probe response associated with the logical unit, or the like) corresponding to the one or more logical units received via the message. Additionally, or alternatively, destination network device 210 may transmit a single acknowledgement message (e.g., a bitmap identifying multiple received logical units) for multiple logical units. For example, based on determining that a threshold period of time has elapsed from transmitting the probe request, destination network device 210 may transmit an acknowledgement message identifying a set of received logical units, messages, segments, or the like. In this case, target network device 210 may be caused to retransmit information (e.g., one or more logical units, messages, segments, or the like) that have not been acknowledged, thereby accounting for information that has been delayed, dropped, misrouted, corrupted, or the like.

As further shown in FIG. 5, process 500 may include determining a logical unit position within a set of received logical units for the one or more logical units included in the segment (block 530). For example, network device 210 (e.g., destination network device 210) may determine the logical unit position within the set of received logical units for the one or more logical units included in the segment. In some implementations, destination network device 210 may determine the logical unit position based on a logical unit identifier identifying the one or more logical units. For example, for a TLV communications protocol, destination network device 210 may utilize TLV identifiers to determine an order for a set of received TLVs. Similarly, for a JSON communications protocol, destination network device 210 may utilize JSON object identification information to determine an order for a set of JSON objects.

In some implementations, destination network device 210 may determine the logical unit position before receiving all logical units of the set of logical units. For example, destination network device 210 may determine an order for one or more received TLVs within a set of TLVs before receiving all TLVs of the set of TLVs. In some implementations, destination network device 210 may determine that a logical unit is associated with a gap between other logical units. For example, destination network device 210 may insert the logical unit between the other logical units. Additionally, or alternatively, destination network device 210 may insert the logical unit as a portion of the gap between the other units. Based on interpreting the data as a set of logical units, network device 210 obviates a need to perform complex fragmentation of data to fill gaps between portions of data.

In some implementations, destination network device 210 may discard duplicate logical units when determining the logical unit position. For example, when target network device 210 transmits and retransmits a particular logical unit and destination network device 210 receives a first copy of the particular logical unit and a second copy of the particular logical unit, destination network device 210 may determine that the first copy of the particular logical unit is to be located at the same logical unit position as the second copy of the particular logical unit, and may discard the first copy of the particular logical unit or the second copy of the particular logical unit. In some implementations, destination network device 210 may discard first information (e.g., a logical unit, a segment, etc.) that overlaps with second information (e.g., another logical unit, another segment, etc.). For example, destination network device 210 may determine, based on processing the first information, that a portion of the first information is duplicated in the second information. In this case, destination network device 210 may discard the first information and may extract non-overlapping logical units from the first information for insertion into the set of logical units, thereby reducing a likelihood of data reassembly being hindered by overlapping data. Additionally, or alternatively, destination network device 210 may extract the non-overlapping data (e.g., a logical unit) from the first information and/or the second information and may determine a logical unit position for the non-overlapping data.

In some implementations, destination network device 210 may reassemble the set of logical units utilizing a parallel processing technique. For example, destination network device 210 may determine an ordering of logical units, remove overlapping data, or the like for logical units of a first portion of a message concurrently with determining an ordering of logical units, removing overlapping data, or the like for logical units of a second portion of the message.

As further shown in FIG. 5, process 500 may include determining that the set of received logical units is complete for the selectively fragmented information (block 540). For example, network device 210 (e.g., destination network device 210) may determine that the set of received logical units is complete for the probe response. In some implementations, destination network device 210 may determine that the set of received logical units is complete based on determining the logical unit position for the one or more logical units. For example, destination network device 210 may determine that the set of received logical units is complete based on determining that each logical unit position corresponds to a received logical unit. Additionally, or alternatively, destination network device 210 may determine that the set of received logical units is complete based on information identifying a quantity of logical units in the probe response. For example, destination network device 210 may track a quantity of received logical units utilizing a bitmap generated by destination network device 210 (e.g., based on information in an initial message identifying an expected quantity of logical units). In this case, when the quantity of non-duplicated logical units in the set of received logical units corresponds to the quantity of logical units identified for the probe response (e.g., via header data of one or more messages), destination network device 210 may determine that the set of received logical units is complete. In this case, destination network device 210 may determine a logical unit position for each logical unit based on determining that the set of received logical units is complete.

As further shown in FIG. 5, process 500 may include providing information associated with the selectively fragmented information based on determining that the set of received logical units is complete for the selectively fragmented information (block 550). For example, network device 210 (e.g., destination network device 210) may provide information associated with the probe response. In some implementations, destination network device 210 may utilize the information associated with the probe response. For example, network device 210 may perform analytics on target network device 210 based on the information associated with the probe response. Additionally, or alternatively, destination network device 210 may determine to connect to a network associated with target network device 210 based on the information associated with the probe response. In some implementations, destination network device 210 may provide the information for utilization. For example, destination network device 210 may provide the information for display via a display device, for processing via a network traffic management device, or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6E are diagrams of an example implementation 600 relating to example processes 400 and 500 shown in FIGS. 4 and 5, respectively. FIGS. 6A-6E show an example of providing a selectively fragmented probe response and performing data reassembly for the selectively fragmented probe response.

Figure 6A:
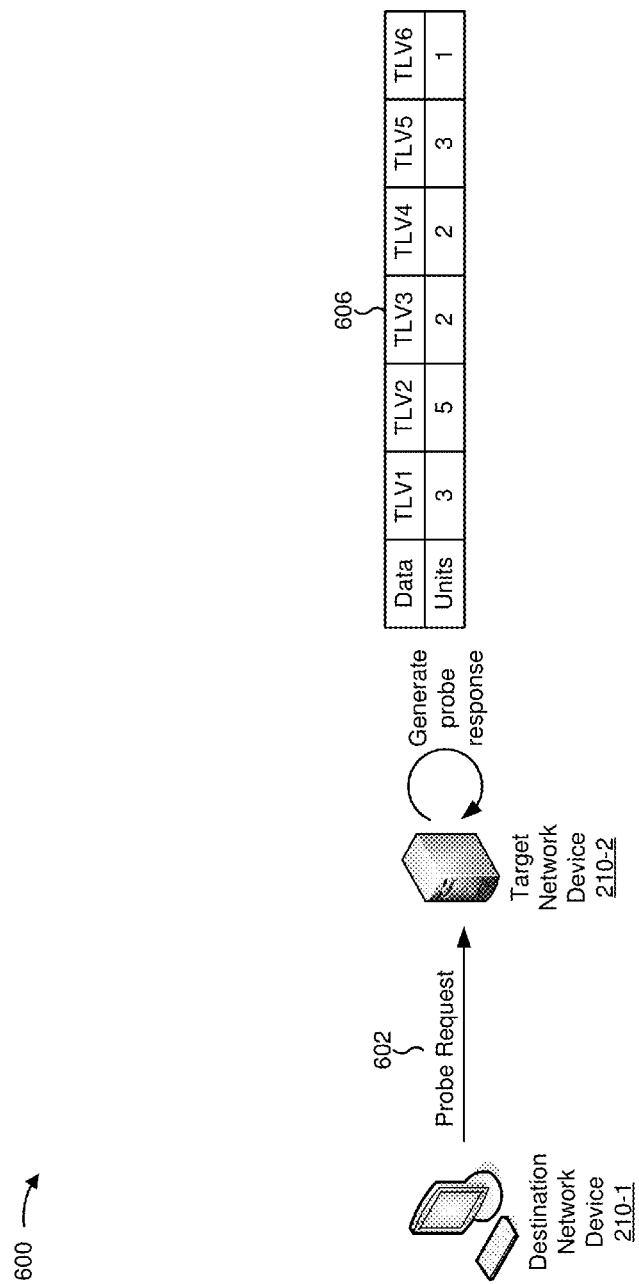
FIGS. 6A-6E are diagrams of an example implementation relating to the example processes shown in FIGS. 4 and 5.

As shown in FIG. 6A, and by reference number 602, destination network device 210-1 transmits a probe request to target network device 210-2 to cause target network device 210-2 to provide a probe response. Target network device 210-2 receives the probe request from destination network device 210-1, and generates probe response 606. Probe response 606 includes a set of TLVs, such as a first TLV (e.g. "TLV1") that includes 3 data units, a second TLV (e.g., "TLV2") that 5 data units, a third TLV (e.g., "TLV3") that includes 2 data units, a fourth TLV (e.g., "TLV4") that includes 2 data units, a fifth TLV (e.g., "TLV5") that includes 3 data units, and a sixth TLV (e.g., "TLV6") that includes 1 data unit).

Figure 6B:
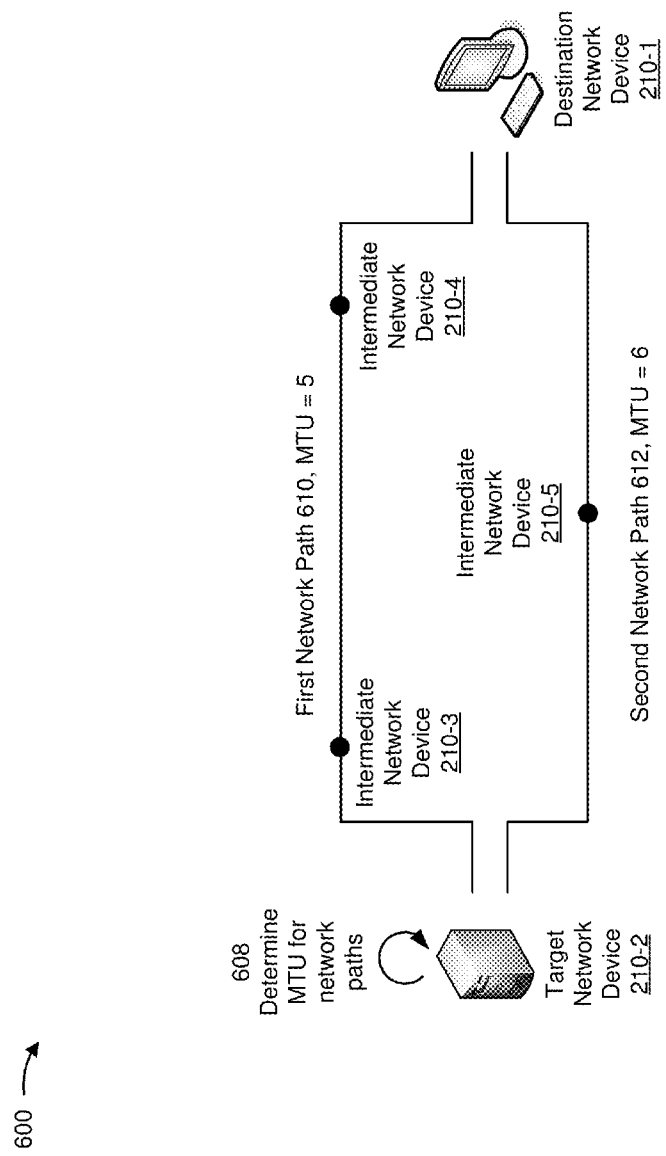

As shown in FIG. 6B, and by reference number 608, target network device 210-2 identifies a set of MTUs for a set of network paths. For example, first network path 610, which includes intermediate network device 210-3 and intermediate network device 210-4, is associated with an MTU of 5. As another example, second network path 612, which includes intermediate network device 210-5, is associated with an MTU of 6. Assume that target network device 210-2 determines to utilize first network path 610 for transmitting the probe response to destination network device 210-1. Assume that target network device 210-2 fragments the probe response into a set of segments for which payload data does not exceed 5 data units based on the MTU of first network path 610.

Figure 6C:
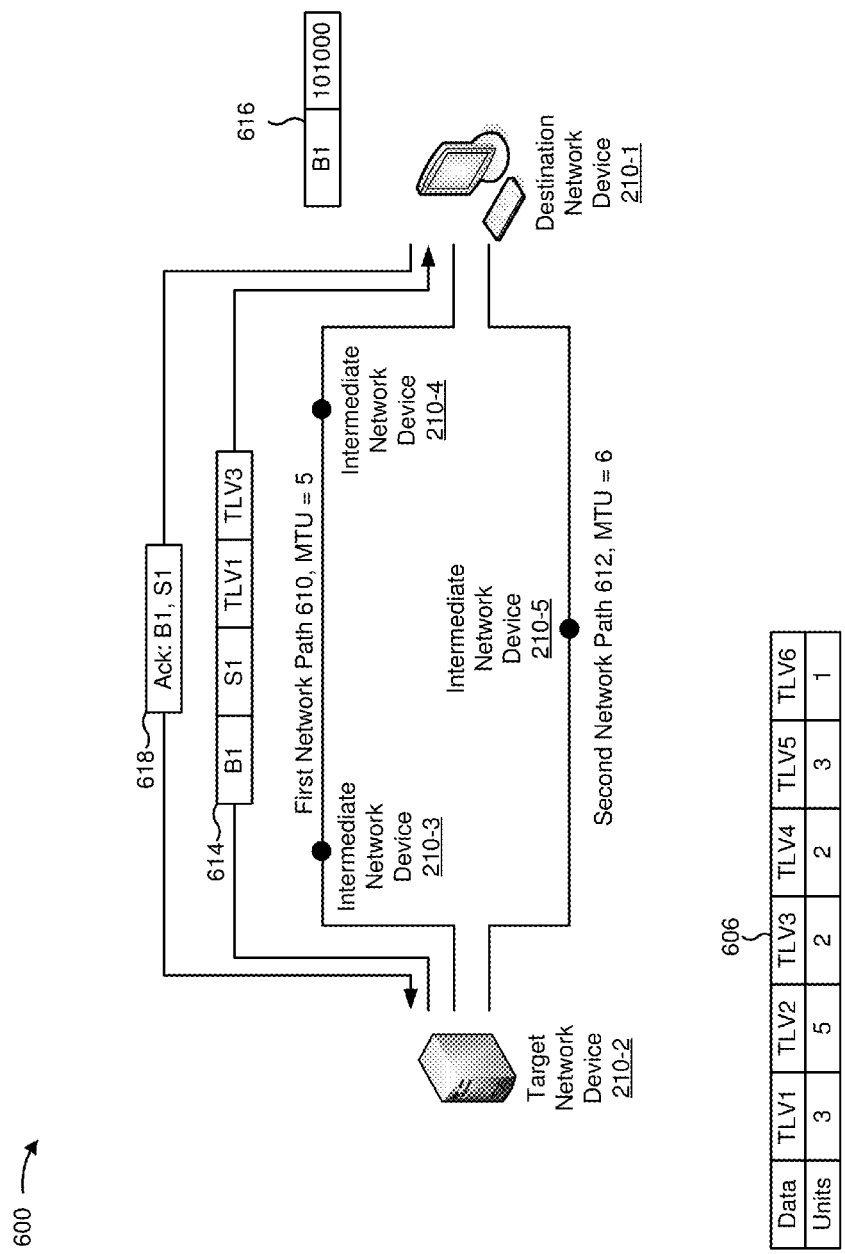

As shown in FIG. 6C, and by reference number 614, target network device 210-2 transmits a first message 614 to destination network device 210-1 via first network path 610. First message 614 includes header information identifying the probe response (e.g., "B1"), header information identifying a segment included in the message (e.g., "S1"), and payload data (e.g., TLV1 and TLV3, totaling 5 data units). Assume that TLV1 and TLV3 are selected by target network device 210-2 for first message 614 based on TLV1 being a fixed optional TLV and, collectively, TLV1 and TLV3 not exceeding the 5 MTU for first network path 610 (e.g., TLV1 and TLV2 total 8 MTU). In this way, target network device 210-2 interleaves TLVs for re-ordering by destination network device 210-1 to reduce network traffic.

With regard to FIG. 6C, based on receiving first message 614, destination network device 210-1 identifies the probe response, the segment of the probe response, and determines a logical unit position for the payload data (e.g., destination network device 210-1 determines that TLV1 and TLV3 represent the first TLV and third TLV of six TLVs, respectively). As shown by reference number 616, destination network device 210-1 generates a bitmap for probe response B1, and alters the bitmap to indicate that TLV1 and TLV3 of the six TLVs have been received by destination network device 210-1. As shown by reference number 618, destination network device 210-1 transmits a first acknowledgement to target network device 210-2 indicating that destination network device 210-1 has received segment S1 for probe response B1.

Figure 6D:
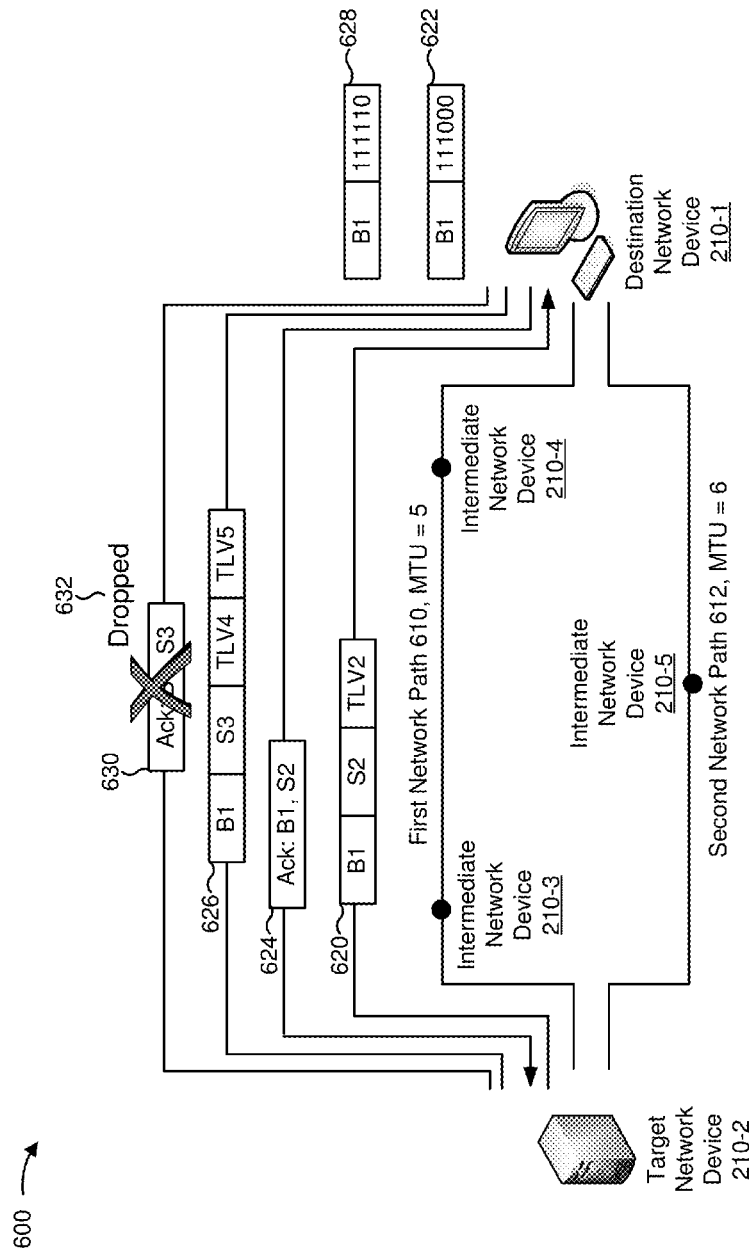

As shown in FIG. 6D, and by reference number 620, target network device 210-2 transmits a second message for probe response B1, including a second segment (e.g., "S2"). Assume that destination network device 210-1 identifies TLV2 in the second segment. As shown by reference number 622, destination network device 210-1 updates the bitmap based on receiving and identifying TLV2. As shown by reference number 624, destination network device 210-1 transmits a second acknowledgement to target network device 210-2 indicating that destination network device 210-1 has received segment S2 for probe response B1. As shown by reference number 626, target network device 210-2 transmits a third message including a third segment (e.g., "S3"). Assume that destination network device 210-1 identifies TLV4 and TLV5 in the third segment. As shown by reference number 628, based on receiving and identifying TLV4 and TLV5, destination network device 210-1 updates the bitmap. As shown by reference number 630, destination network device 210-1 transmits a third acknowledgement; however, as shown by reference number 632, the third acknowledgement is dropped and is not received by target network device 210-2.

Figure 6E:
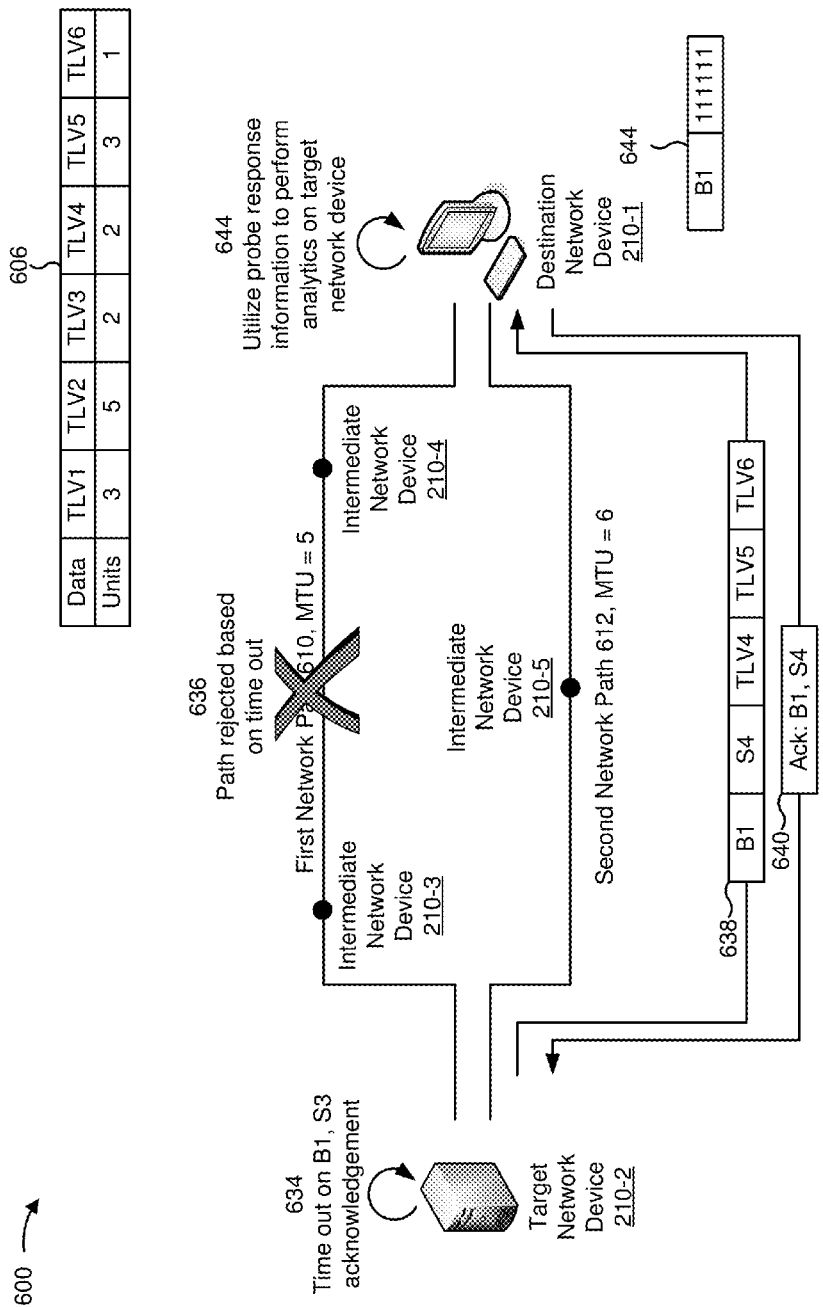

As shown in FIG. 6E, and by reference number 634, target network device 210-2 times out a timer associated with receiving the third acknowledgement of receipt of segment S3 by destination network device 210-1 (e.g., a threshold quantity of time elapses). As shown by reference number 636, based on timing out the third acknowledgment, target network device 210-2 rejects first network path 610 and determines to utilize second network path 612 for transmitting information to destination network device 210-1. In another example, target network device 210-2 may experience an MTU change for first network path 610 causing utilization of the second network path 612. As shown by reference number 638, target network device 210-2 transmits a fourth message to destination network device 210-1, including a fourth segment. Assume that target network device 210-2 includes TLV4, TLV5, and TLV6 in the fourth segment. In this way, target network device 210-2 resends unacknowledged TLVs to prevent data from failing to be received by destination network device 210-1.

With regard to FIG. 6E, assume that destination network device 210-1 identifies TLV4, TLV5, and TLV6 and discards TLV4 and TLV5 as being duplicates of received TLVs (e.g., received via the third message). As shown by reference number 640, destination network device 210-1 updates the bitmap, thereby facilitating a determination that the six TLVs have been received. As shown by reference number 642, destination network device 210-1 transmits a fourth acknowledgement to target network device 210-2 indicating receipt of segment S4 for probe response B1. As shown by reference number 644, destination network device 210-1 utilizes the probe response (e.g., based on receiving and ordering the TLVs) to perform analytics on target network device 210-2.

As indicated above, FIGS. 6A-6E are provided merely as an example. Other examples are possible and may differ from what was described with regard to FIGS. 6A-6E.

In this way, a first network device 210 selectively fragments information (e.g., a probe response to a probe request) into a set of segments and transmits the set of segments to a second network device 210 via a set of messages. Moreover, the second network device 210 receives the set of segments, re-orders logical units included in the set of segments (e.g., when the logical units are out of order), and utilizes information represented by the logical units.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors, coupled to a communication interface, configured to:
   receive a request for one or more parameters associated with the device;
   determine, as a response, the one or more parameters associated with the device;
   generate a set of logical units associated with encapsulating the one or more parameters,
      the set of logical units being associated with a particular communications protocol,
         the particular communications protocol being a type-length value (TLV) communications protocol and the set of logical units being a set of TLVs;
   determine that a first set of TLVs, of the set of TLVs, is intended for each message of a set of messages,
      the first set of TLVs including information identifying a logical unit position for a logical unit included in the message;
   determine that a second set of TLVs, of the set of TLVs, is not intended for each message of the set of messages;
   fragment the set of logical units into a set of segments based on a maximum transmission unit (MTU) size for a network path,
      the set of logical units being fragmented without fragmenting any logical units of the set of logical units, and
      the second set of TLVs being fragmented into the set of segments; and
   transmit the set of segments to a destination network device by including the first set of TLVs and a segment, of the set of segments, in each message.

2. The device of claim 1, where the one or more processors are further to:
   determine a boundary associated with a particular logical unit of the set of logical units; and
   where the one or more processors, when fragmenting the set of logical units into the set of segments, are to:
      fragment the particular logical unit at the boundary associated with the particular logical unit.

3. The device of claim 1, where the one or more processors, when fragmenting the set of logical units into the set of segments, are to:
   include multiple logical units, of the set of logical units, in a single segment of the set of segments.

4. The device of claim 1, where the set of logical units are associated with a particular order; and
   where the one or more processors, when fragmenting the set of logical units into the set of segments, are to:
      re-order the set of logical units into another order such that a first quantity of segments generated when fragmenting the set of logical units based on the other order is less than a second quantity of segments generated when fragmenting the set of logical units based on the particular order.

5. The device of claim 1, where the one or more processors, when transmitting the set of segments, are to:
   cause the destination network device to reassemble the response from the set of segments.

6. The device of claim 1, where the one or more processors are further to:
   determine that a threshold quantity of time associated with receiving an acknowledgement associated with a particular message, of the set of messages via which the set of segments is transmitted, has elapsed, the particular message including one or more logical units; and transmit another message based on determining that the threshold quantity of time has elapsed,
the other message including the one or more logical units.

7. The device of claim 1, where the one or more processors, when transmitting the set of segments to the destination network device, are to:
transmit, via a message of the set of messages via which the set of segments is transmitted, information identifying the response with which the message is associated.

8. A non-transitory computer-readable medium storing instructions, the instructions comprising:
one or more instructions that, when executed by one or more processors, cause the one or more processors to:
transmit a probe request to a target network device,
the probe request being associated with causing the target network device to generate a probe response;
receive, via a particular network path, a message of a set of messages, including a segment, of a set of segments, associated with the probe response based on transmitting the probe request,
the probe response being application-level fragmented into the set of segments by the target network device based on a maximum transmission unit (MTU) size of the particular network path,
the segment including one or more logical units of a set of logical units,
a logical unit, of the set of logical units, including information associated with the probe response,
the set of logical units being associated with a particular communications protocol,
the particular communications protocol being a type-length value (TLV) communications protocol and the set of logical units being a set of TLVs,
a first set of TLVs, of the set of TLVs, being intended for each message of the set of messages,
the first set of TLVs including information identifying a logical unit position for a logical unit included in the message;
a second set of TLVs, of the set of TLVs, not being intended for each message of the set of messages;
determine a logical unit position, within the set of logical units, for each logical unit, of the one or more logical units, after receiving the segment;
determine that a set of received logical units is complete for the probe response after receiving the segment; and
provide information associated with the probe response based on determining that the set of received logical units is complete for the probe response and based on determining the logical unit position, within the set of logical units, for each logical unit of the one or more logical units.

9. The non-transitory computer-readable medium of claim 8, where the segment is a first segment; and
where the one or more instructions, when executed by the one or more processors, further cause the one or more processors to:
determine that a first logical unit, of the set of logical units, received via the first segment corresponds to a second logical unit, of the set of logical units, received via a second segment; and
discard the first logical unit or the second logical unit based on determining that the first logical unit corresponds to the second logical unit.

10. The non-transitory computer-readable medium of claim 8, where the one or more instructions, when executed by the one or more processors, further cause the one or more processors to:
determine a logical unit identifier associated with a particular logical unit of the one or more logical units; and
where the one or more instructions, that cause the one or more processors to determine the logical unit position, further cause the one or more processors to:
determine the logical unit position based on the logical unit identifier.

11. The non-transitory computer-readable medium of claim 8, where the one or more instructions, when executed by the one or more processors, further cause the one or more processors to:
receive information via an initial message, of the set of messages associated with transmission of the set of segments, identifying an expected quantity of logical units associated with the probe response;
generate a bitmap based on the expected quantity of logical units associated with the probe response,
the bitmap being associated with tracking a quantity of received logical units of the set of logical units; and
where the one or more instructions, that cause the one or more processors to receive the segment, further cause the one or more processors to:
determine a quantity of logical units, of the set of logical units, that are included in the segment and that have not been previously received; and
update the bitmap based on the quantity of logical units that are included in the segment and that have not been previously received.

12. The non-transitory computer-readable medium of claim 11, where the one or more instructions, that cause the one or more processors to determine that the set of received logical units is complete, further cause the one or more processors to:
determine that the set of received logical units is complete based on updating the bitmap.

13. The non-transitory computer-readable medium of claim 8, where the one or more instructions, when executed by the one or more processors, further cause the one or more processors to:
determine that a threshold quantity of time has elapsed associated with receiving another segment of the set of segments,
the other segment not having been received,
the other segment including the one or more logical units of the set of logical units; and
where the one or more instructions, that cause the one or more processors to receive the segment of the set of segments, further cause the one or more processors to:
receive the segment based on determining that the threshold quantity of time has elapsed.

14. The non-transitory computer-readable medium of claim 8, where the set of logical units includes at least one of:
a set of type-length-value communications protocol logical units,
a set of extensible markup language communications protocol logical units, or a set of JavaScript object notation communications protocol logical units.

15. The non-transitory computer-readable medium of claim 8, where the second set of TLVs is fragmented into the set of segments.

16. A method, comprising:
receiving, by a device, a request for one or more parameters associated with the device;
determining, by the device and as a response, the one or more parameters associated with the device;
generating, by the device, a set of logical units associated with encapsulating the one or more parameters,
the set of logical units being associated with a particular communications protocol,
the particular communications protocol being a type-length value (TLV) communications protocol and the set of logical units being a set of TLVs;
determining, by the device, that a first set of TLVs, of the set of TLVs, is intended for each message of a set of messages,
the first set of TLVs including information identifying a logical unit position for a logical unit included in the message;
determining, by the device, that a second set of TLVs, of the set of TLVs, is not intended for each message of the set of messages,
fragmenting, by the device, the set of logical units into a set of segments based on a maximum transmission unit (MTU) size for a network path,
the set of logical units being fragmented without fragmenting any logical units of the set of logical units, and
the second set of TLVs being fragmented into the set of segments; and
transmitting, by the device, the set of segments to a destination network device by including the first set of TLVs and a segment, of the set of segments, in each message.

17. The method of claim 16, where transmitting the set of segments comprises:
transmitting the set of segments based on receiving a retry request to transmit the set of segments.

18. The method of claim 16, where transmitting the set of segments comprises:
receiving a request to transmit the set of segments; and
transmitting the set of segments based on receiving the request to transmit the set of segments.

19. The method of claim 16, where causing the set of logical units to be fragmented into the set of segments comprises:
causing the set of logical units to be selectively fragmented into the set of segments, such that each segment of the set of segments, when transmitted via a message of the set of messages, does not cause the message to exceed a maximum transmission unit (MTU) size of a network path via which the message is transmitted.

20. The method of claim 16, where the set of logical units includes at least one of:
a set of type-length-value communications protocol logical units,
a set of extensible markup language communications protocol logical units, or
a set of JavaScript object notation communications protocol logical units.

* * * * *